US009215559B2

(12) United States Patent
Dave et al.

(10) Patent No.: US 9,215,559 B2
(45) Date of Patent: Dec. 15, 2015

(54) ADDING GEO-FENCES BASED ON TIME

(71) Applicant: Apple Inc., Cupertino, CA (US)

(72) Inventors: Swapnil R. Dave, Santa Clara, CA (US); Kaustubh M. Rao, Santa Clara, CA (US)

(73) Assignee: APPLE INC., Cupertino, CA (US)

(*) Notice: Subject to any disclaimer, the term of this patent is extended or adjusted under 35 U.S.C. 154(b) by 210 days.

(21) Appl. No.: 13/784,645

(22) Filed: Mar. 4, 2013

(65) Prior Publication Data

US 2014/0248910 A1 Sep. 4, 2014

(51) Int. Cl.
H04W 24/00 (2009.01)
H04M 11/04 (2006.01)
H04W 4/02 (2009.01)
G06Q 10/00 (2012.01)
H04W 4/04 (2009.01)

(52) U.S. Cl.
CPC ............... *H04W 4/021* (2013.01); *G06Q 10/00* (2013.01); *H04W 4/046* (2013.01)

(58) Field of Classification Search
CPC ......... H04W 4/02; H04W 4/028; H04W 4/22; H04W 52/0254; H04W 76/007; H04W 4/022; H04W 48/04; H04W 4/04; H04W 4/046; G01S 19/17; G01S 19/48; G01S 5/0027; G01S 5/0231; G08G 1/096725; G08G 1/096838
USPC ........... 455/404–2, 466.3, 456.1, 67.1, 404.2, 455/456.3
See application file for complete search history.

(56) References Cited

U.S. PATENT DOCUMENTS

| 6,259,381 | B1 | 7/2001 | Small |
| 7,109,848 | B2 | 9/2006 | Schybergson |
| 7,493,211 | B2 | 2/2009 | Breen |
| 8,054,180 | B1 | 11/2011 | Scofield et al. |
| 2006/0241862 | A1 * | 10/2006 | Ichihara et al. ............ 701/209 |
| 2008/0075243 | A1 | 3/2008 | Kent et al. |
| 2009/0222482 | A1 | 9/2009 | Klassen et al. |
| 2010/0017118 | A1 | 1/2010 | Dougherty |
| 2010/0295676 | A1 | 11/2010 | Khachaturov et al. |
| 2011/0066366 | A1 | 3/2011 | Ellanti et al. |
| 2011/0070872 | A1 | 3/2011 | Ellanti et al. |
| 2013/0120595 | A1 | 5/2013 | Roach et al. |

(Continued)

OTHER PUBLICATIONS

Office Action, dated Sep. 25, 2014, received in U.S. Appl. No. 13/784,695, 24 pages.

(Continued)

*Primary Examiner* — Omoniyi Obayanju
(74) *Attorney, Agent, or Firm* — Morgan, Lewis & Bockius LLP

(57) ABSTRACT

A user can create geo-fences by providing a first identifier, e.g., a name of a store or a category of merchandise, and a location-based function that is triggered when the user's mobile device crosses a boundary of a geo-fence. An elapsed time that the geo-fences are not triggered can be monitored. If the elapsed time exceeds a threshold, additional geo-fences can be added based on a second identifier that is associated with the additional geo-fences. Whether the elapsed time is going to exceed the threshold can be predicted, and the additional geo-fences added at the time of the prediction, which may be before the elapsed time actually exceeds the threshold. Additionally, the user can be prompted regarding adding additional geo-fences before or after the elapsed time might exceed the threshold.

51 Claims, 7 Drawing Sheets

(56) References Cited

U.S. PATENT DOCUMENTS

| | | |
|---|---|---|
| 2014/0162692 A1* | 6/2014 | Li et al. ............ 455/456.3 |
| 2014/0247383 A1 | 9/2014 | Dave et al. |
| 2014/0248910 A1 | 9/2014 | Dave et al. |

OTHER PUBLICATIONS

Final Office Action, dated Jan. 28, 2015, received in U.S. Appl. No. 13/784,695, 26 pages.

* cited by examiner

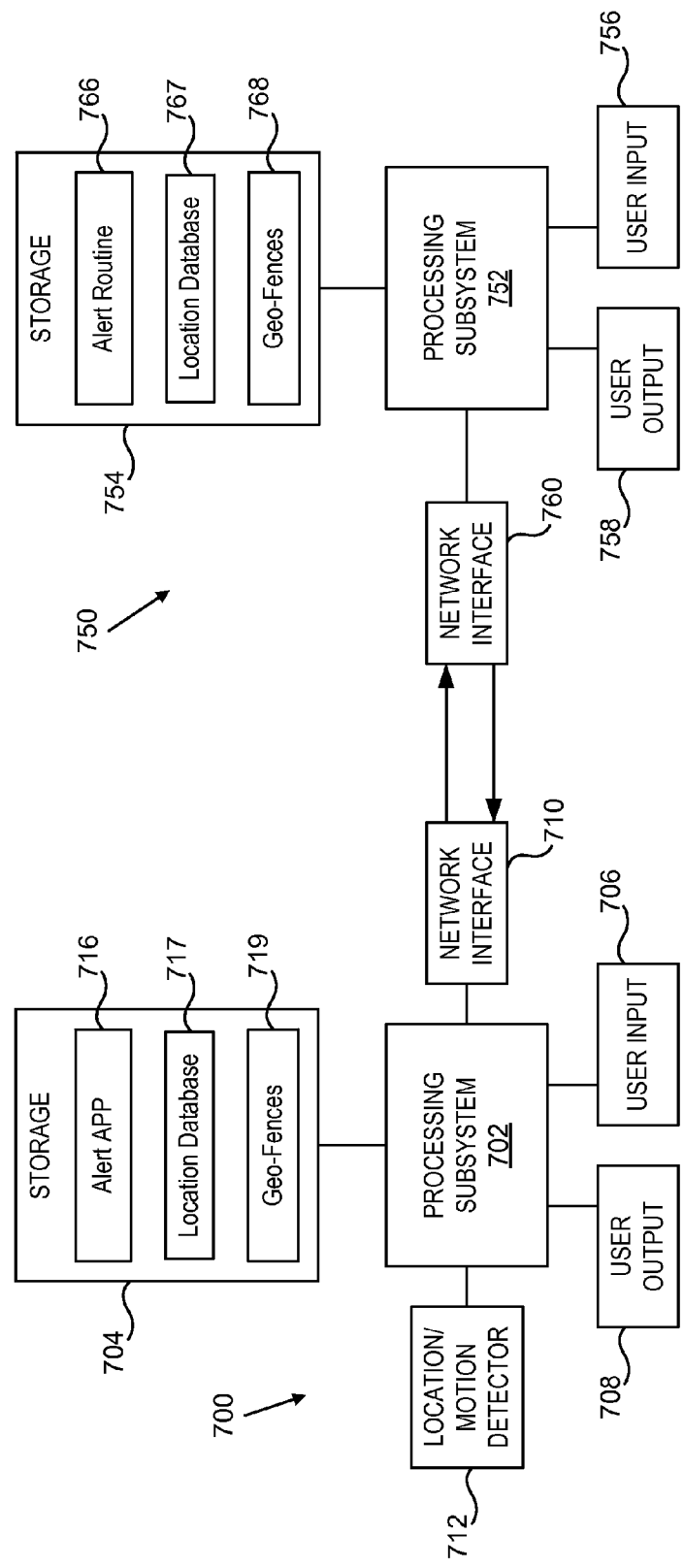

ADDING GEO-FENCES BASED ON TIME

BACKGROUND

Geo-fences allow a user to specify a location for receiving an alert on the user's phone the next time the user is at the location. For example, a user can set an alert, such as "get eggs," for a grocery store. Then, the next time the user is at the grocery store, the geo-fence would be triggered and the alert sent to the user. However, it is possible that the user does not go to the grocery store for a long time. In such an instance, the geo-fence is not very helpful for obtaining eggs.

Therefore, it is desirable to provide methods, systems, and apparatuses for addressing situations where an initial set of geo-fences are not triggered.

BRIEF DESCRIPTION OF THE DRAWINGS

FIG. 7A is a simplified block diagram of an implementation of a device 700 according to an embodiment of the present invention. FIG. 7B is a simplified block diagram of an implementation of map server 750 according to an embodiment of the present invention.

DETAILED DESCRIPTION

To make location-based alerts (or other location-based functions) more useful, embodiments can add other suitable geographical areas (e.g., geo-fences) to the initial geographical areas being used as a trigger. For example, suppose an initial geo-fence is established at a particular location in response to user input specifying a particular store or chain of stores, e.g., by using the name of the store. But suppose the user does not go near the particular location, and thus the geo-fence is not triggered.

The amount of time passing without a trigger can be monitored to determine when a threshold amount of time has passed without a trigger. The monitoring can be done, for example, at the user's phone or at a server in communication with the user's phone. After the threshold time is reached, geo-fences can be created around additional locations. With more geo-fences, it can be more likely that one of them will be triggered. The additional locations can be identified based on various factors, such as sharing common keywords with the initial locations used to create the initial geo-fences. For instance, the additional locations can include a different chain of stores, but which are associated with a same category as the initial locations. The shared keywords could be identified from a database that stores keywords associated with various locations.

As an example, a user might create a geo-fence for the user's mobile device via a voice command by saying "remind me to pick up shampoo at drugstore X". In response, one or more geo-fences can be created for drugstore X. If the geo-fence(s) are not triggered for three days (or other threshold), then the mobile device or a server can broaden the set of geo-fences to include other drug stores. Thus, other geo-fences may be created for other drug stores. In such a scenario, the end result would be more geo-fences created, and thus a greater likelihood that one of the geo-fences would be triggered.

I. Triggering Geo-Fences

In one embodiment, a geo-fence can be created as a circle of a default radius around a location. This circle perimeter acts as a boundary for determining when the geo-fence is triggered. If a mobile device, for which the geo-fence has been established, is identified as crossing the boundary (e.g., using GPS or other location identification techniques), then the geo-fence is triggered. In response to the trigger, an alert (or other location-based function) can be provided to the user. An example of a geo-fence not getting triggered is now provided.

Figure 1:
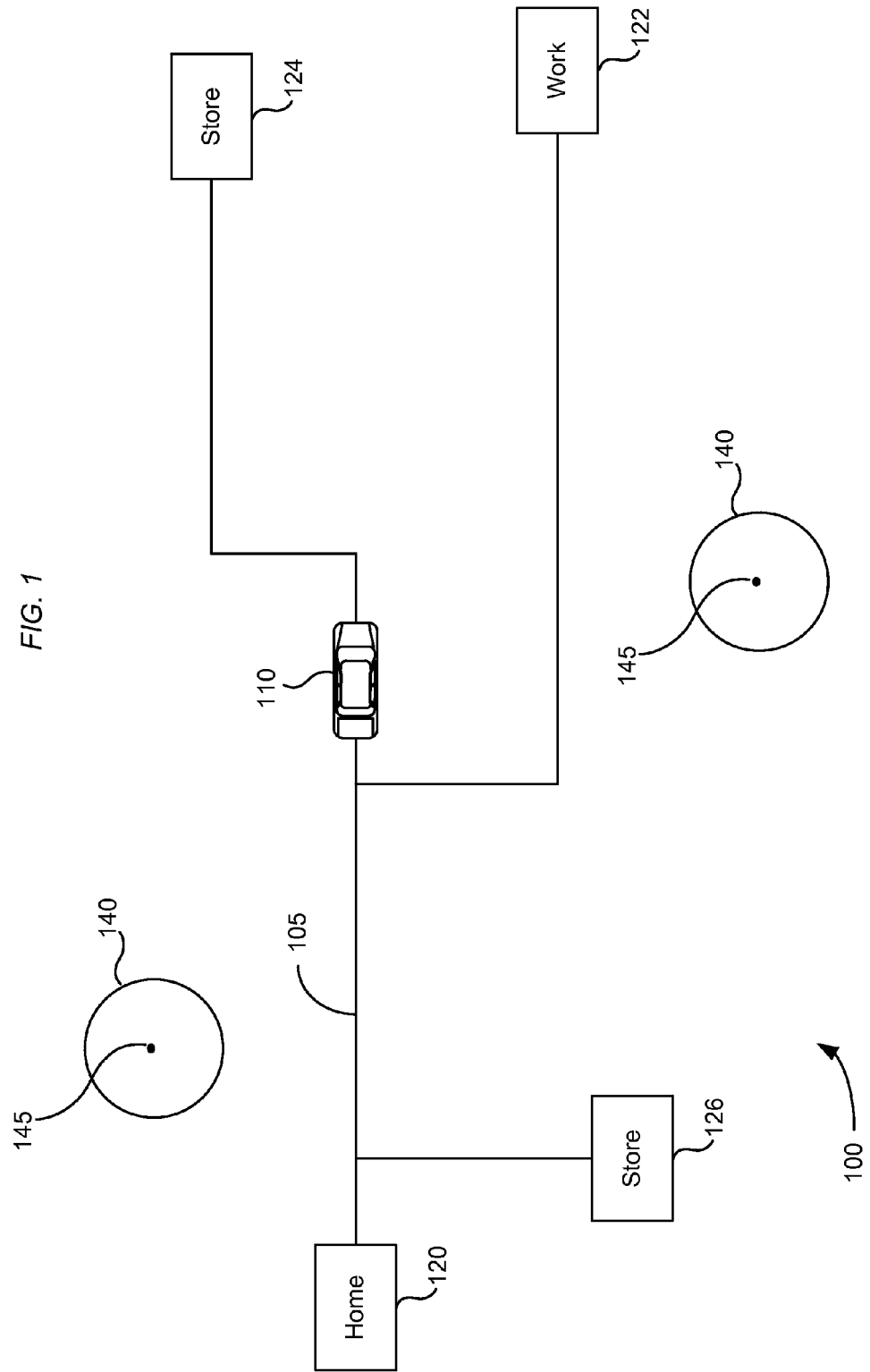
FIG. 1 is a diagram 100 showing two geo-fences and a path being traveled by a user, where the user does not trigger the two geo-fences.

FIG. 1 is a diagram 100 showing two geo-fences and a path being traveled by a user, where the user does not trigger the two geo-fences. As shown, a path 105 corresponds to various paths traveled by a user 110 (shown in a car) during a 48 hour period, which is an example of a threshold time. As shown, user 110 has traveled path 105 among home 120, work 122, store 124, and store 126.

Two geo-fences 140 are shown around corresponding locations 145. The locations 145 might correspond to a particular store X or a particular type of store, e.g., a grocery store or a drug store. To establish geo-fences 140, the user 110 can enter information into a mobile device (e.g., a phone or the car itself) that moves with the user, where the location of the mobile device can be obtained. As an alternative, the user could enter the information identifying locations 145 into a server, which is in communication with the mobile device.

Path 105 does not cross geo-fences 140, and thus the geo-fences are not triggered. In such a situation, the user does not receive an alert (or result in other functionality) as is programmed to occur when one of the geo-fences 140 is triggered. As user 110 only travels along path 105 for 48 hours (or other the time period after geo-fences 140 are established), user 110 is deprived of any benefit of the geo-fences for those 48 hours. For example, user 110 may forget that geo-fences were even established (e.g., to pick up something at locations 145), thereby depriving user 110 of the object to be picked up. This problem may be compounded byt that the fact that the object to be picked up could be available at other stores not initially identified for creating a geo-fence. Embodiments can address such a problem.

II. Adding Geo-Fences

As mentioned above, geo-fences may be created to send a reminder when the user passes near a location. A user may do this because the user may not need to go to the designated location (e.g., a drug store) right away. Thus, the user may only want to go to the drug store when the user passes near the drug store. An alert can be provided to the user when the user does get close, as determined by the geo-fence. But, as pointed out above, the user may not pass by any of the designated locations for quite a long time. However, at some point, the user would need to go the store.

Figure 2:
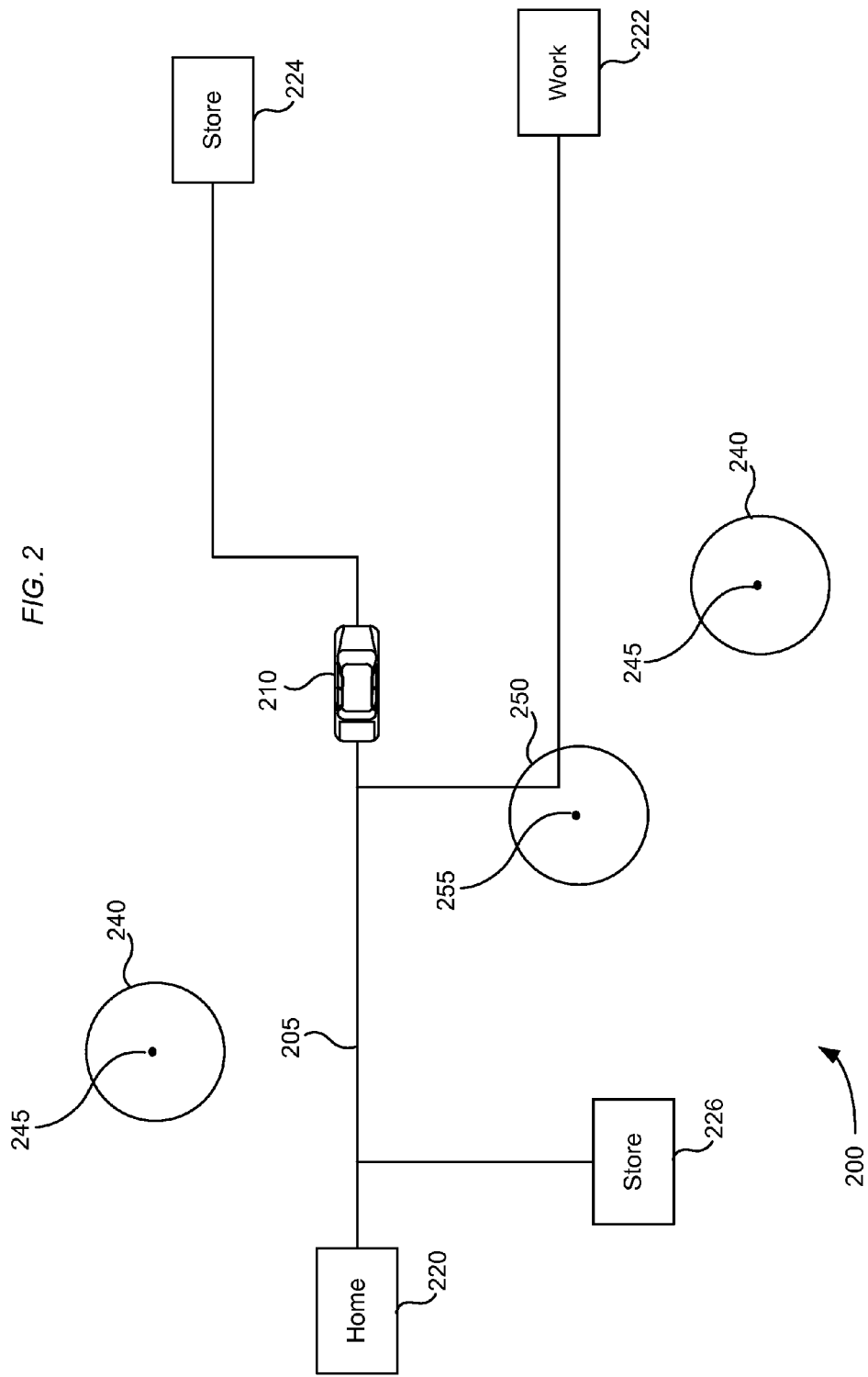
FIG. 2 is a diagram 200 illustrating the addition of a geo-fence according to embodiments of the present invention.

FIG. 2 is a diagram 200 illustrating the addition of a geo-fence according to embodiments of the present invention. Diagram 200 corresponds to diagram 100, except for the addition of location 255 and geo-fence 250. If user 210 travels path 205 among home 220, work 222, store 224, and store 226 for the threshold time after establishing the geo-fences 240 around locations 245, geo-fences 240 will not be triggered.

When the threshold time (which may be set by a user) is reached without a trigger of geo-fences 240, one or more additional geo-fences can be added. As shown, geo-fence 250 is added around location 255. For example, the user's mobile device or a server in communication with the user's mobile device can start a timer when the geo-fences 240 are established. In this scenario, the two geo-fences 240 are established at the same time using a single criteria (e.g., a name of a store or a category of a store, such as a grocery store). When the timer expires, the mobile device and/or the server can determine other locations that might satisfy the original criteria entered by the user, or otherwise be useful for the desired functional result of the initial geo-fences 240.

Location 255 may be identified based on similarities with locations 245. For example, location 255 may correspond to drug store Y, where locations 245 correspond to drug store X. Or, location 255 may correspond to a gas station that has a food mart, and locations 245 may correspond to the category of grocery store, where the user may have entered an initial criteria of "grocery store" as an identifier of the locations for the initial geo-fences. In one embodiment, the term "grocery store" may have a list of synonyms or dependent keywords that can be used for identifying the gas station with the food mart as a possible alternative.

In one embodiment, the geographical coordinates of location 255 are not known before location 255 is identified for adding to the set of geo-fences used for the reminder. As shown, geo-fence 250 happens to encompass path 205 when user 210 travels to work 222. However, in other instances, the added location may not necessarily be triggered soon, or be on a path recently traveled by user 210. In another embodiment, the geographical coordinates of location 255 are known before location 255 is added to the set of geo-fences used for the reminder. For example, locations having corresponding geo-fence that encompass a path recently traveled by user 210 within the threshold time period may be identified, and those locations added. In one implementation, only those geo-fences that encompass the path recently traveled are added for the reminder (or other location-based function).

Figure 3:
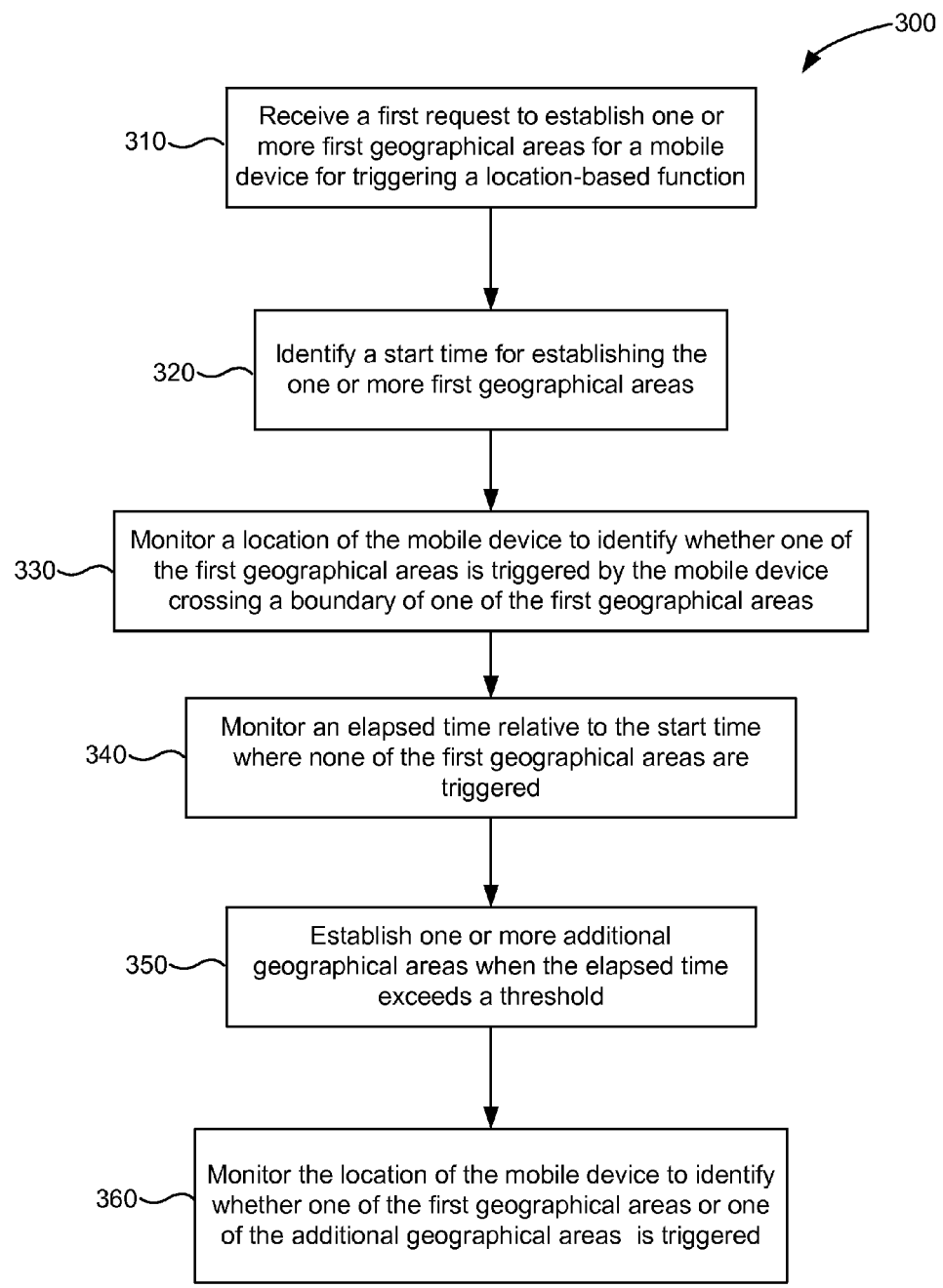
FIG. 3 is a flowchart illustrating a method 300 for managing geographical areas (e.g., geo-fences) associated with a location-based function according to embodiments of the present invention.

FIG. 3 is a flowchart illustrating a method 300 for managing geographical areas (e.g., geo-fences) associated with a location-based function according to embodiments of the present invention. Method 300 may be performed entirely or partially by a computer, such as a phone or tablet computer, as can other methods described herein. The location-based function can be associated with one or more locations, each with a geographical area (e.g., a geo-fence) around it.

At block 310, a first device receives, from a user, a first request to establish one or more first geographical areas for a mobile device for triggering a location-based function. In various embodiments, the first device can be the mobile device itself or a server computer in communication with the mobile device. The request may be provided in any suitable manner, e.g., via a voice comment or by entering text. The request can act as a query to a database for identifying locations that match the request. The location-based function (e.g., an alert) can be triggered by the mobile device crossing a boundary of the first geographical areas. Thus, the first geographical areas can be stored associated with a particular location-based function, and vice versa.

The first request includes a first identifier that identifies a first set of one or more locations for establishing the one or more first geographical areas. For example, the first identifier could be the name of a particular store, which might correspond to one or more branches of the store. As another example, the first identifier could correspond to a category that corresponds to various stores. In one embodiment, a server stores a plurality of locations within a database, where each location includes a plurality of keywords (e.g., corresponding to categories or an associated name) for matching to the request from the user.

The first request can include the function to be performed, e.g., whether the function is an alert or other function. For an alert, the user can specify a particular message to be sent, or other ways to perform the alert (e.g., rings or vibrations). A user interface can be provided for selecting the type of function (e.g., alert, an organization function of media, playing of media, etc.) and the specific action to be performed.

At block 320, a start time is identified for establishing the one or more first geographical areas. The start time may be the instant that the request is received and the first device establishes the first geographical areas. In another implementation, the start time may be specified. For example, a user could specify that the location-based function is not to be triggered until a specified time, which may be a relative time compared to the time of the request or an absolute time (e.g., a time of day and/or date).

At block 330, a location of the mobile device is monitored to identify whether one of the first geographical areas is triggered by the mobile device crossing a boundary of one of the first geographical areas. The monitoring can be performed in various ways. For example, the first device can periodically check the location of the mobile device and compare the location to one or more of the first geographical areas. In one embodiment, the comparison can be to just one of the first geographical areas that was previously identified as being close to a last location of the mobile device.

At block 340, an elapsed time relative to the start time where none of the first geographical areas are triggered is monitored. The elapsed time can be measured with a timer that is set at the start time (e.g., when the user request was received. The elapsed time can be compared to a threshold time. The threshold time can represent an amount of time that the user is willing to wait until more options for locations are used to create geo-fences. In one embodiment, the user can specify the amount of time by speaking, using a graphical user interface, or entering text. The elapsed time can be in any units. In another embodiment, the threshold time can be determined by a device (e.g., the mobile device or a server), which may have a default value or dynamically determine the threshold from other criteria.

At block 350, one or more additional geographical areas are established when the elapsed time exceeds a threshold. The one or more additional geographical areas can be identified based on a second identifier that identifies a second set of locations not in the first set of locations. In one embodiment, the second identifier identifies both the second set of locations and the first set of locations. Thus, the second identifier can correspond to a broader category than the first identifier. In another embodiment, the second identifier does not identify any of the first set of locations, e.g., where the first identifier is the name of store X and the second identifier is the name of store Y. In such an instance, the second identifier can be determined based on one or more similar keywords that are associated with store X and store Y in a database.

In one embodiment, the one or more additional geographical areas are established automatically when the elapsed time exceeds a threshold. In another embodiment, the one or more additional geographical areas are not established automatically when the elapsed time exceeds a threshold. For example, the user can be notified that the elapsed time exceeds the threshold, and be prompted as to whether the additional geographical areas are to be established. The prompt could be an audio or visual request for a response as to the adding the geographical areas. The prompt could include indications of which geographical areas are to be added, e.g., as a list or on a map. Various options could be provided for selecting all or some of the geographical areas to be added. The additional geographical areas may be established in response to an affirmative indication from the user. If no response is received, embodiments can default to adding or not adding the additional geographical areas.

At block 360, the location of the mobile device is monitored to identify whether one of the first geographical areas or one of the additional geographical areas is triggered by the mobile device crossing a boundary of one of the first geographical areas or one of the additional geographical areas. When the geo-fence is triggered, an alert can be provided. Other functionality can be performed in addition or instead of an alert when the geo-fence is triggered. For example, a song or a video could be played in response to the trigger, an event could be added to a calendar, etc.

III. Monitoring Elapsed Time

As mentioned above, the elapsed time can be monitored by starting a timer from the start time. In such an example, the additional geographical areas are only added at a point in time when the timer reaches the threshold. However, this means the user has to endure the full threshold time without the location-based function being triggered. Some embodiments can predict that the elapsed time will reach the threshold without triggering the first geographical areas, and thus be able to add the additional geographic areas before the threshold is reached.

In one embodiment, the elapsed time period can be analyzed by viewing a person's route. The device can determine that the user is not going to trigger a geo-fence within the specific time period, e.g., based on a current velocity and the planned route. At the time of the prediction, the geo-fences at the other locations can be created. Thus, the elapsed time can correspond to a prediction.

Figure 4:
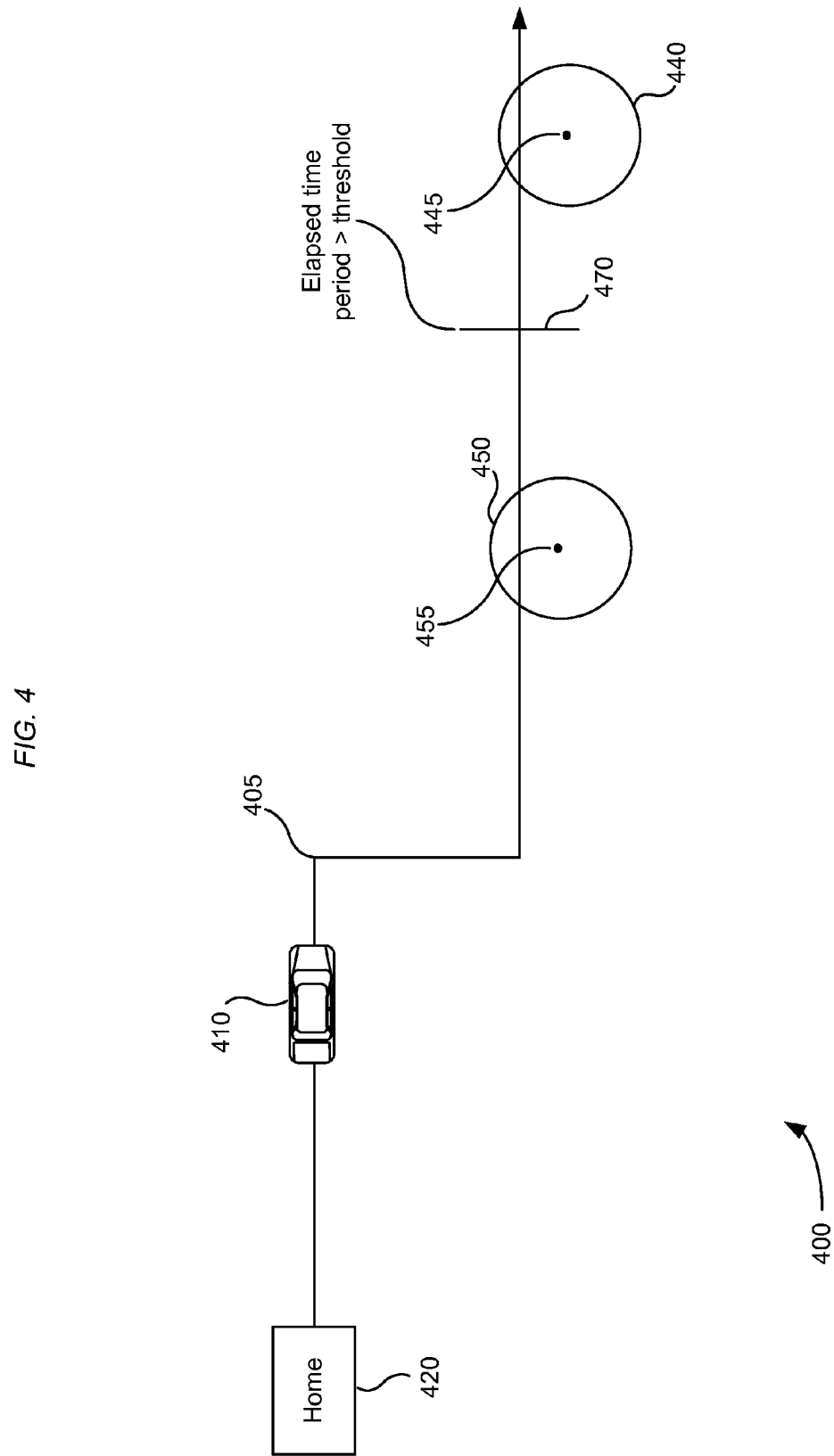
FIG. 4 is a diagram 400 showing the creation of an additional geographic area before the elapsed time reaches the threshold based on a prediction according to embodiments of the present invention.

FIG. 4 is a diagram 400 showing the creation of an additional geographic area before the elapsed time reaches the threshold based on a prediction according to embodiments of the present invention. In this example, the prediction is that the user 410 will not reach first geographical area 440 corresponding to first location 445 before the elapsed time reaches the threshold, which would occur at point 470. In this example, start time may have occurred at the beginning of the trip (e.g., when user 410 left home 420), but may also occur before or after the departure time. For example, the user request to create the initial geographical areas may be received after departure.

The user's mobile device or a server can determine that the elapsed time period will be hit at point 470 based on route 405. Route 405 may be known, e.g., as the user may have entered a destination into the mobile device, and a current location may be known. Thus, a device can compute a prediction that the first geo-fences would not be triggered until after the threshold is reached. Given this knowledge, the device can cause a geo-fence 450 for location 455 to be created before user 410 reaches 470 (or before the threshold is reached, as there can be some deviation) since the geofence is not predicted to be triggered before then.

The determination that the elapsed time will reach the threshold without a trigger can be made at any time after the route is known. Various factors may be used to determine when the prediction is to be made. For example, embodiments can wait until user 410 has traveled a certain amount (e.g., percentage, distance, or time) along route 405 before making the prediction about whether one of the first geographical areas will be triggered before the elapsed time will reach the threshold.

In response to the prediction that the elapsed time will reach the threshold, location 455 is identified with a geographical area 450 that encompasses route 405. In one embodiment, only additional locations having a geographical area that encompasses the expected route are added to the location-based function. In another embodiment, additional locations that have a geographical area that is near to route 405, but not quite encompassing route 405 (e.g., within a specified distance), can be added, in case user 410 deviates from the assigned route.

Accordingly, in one embodiment, the monitoring of the elapsed time includes receiving a route to be traveled by the mobile device and comparing the route to the one or more first geographical areas. The route can be received from user input to the mobile device, e.g., input of a starting location and a destination. The comparison can determine whether the mobile device will trigger one of the first geographical areas before the elapsed time exceeds the threshold. If it is determined that the mobile device will not trigger one of the first geographical areas before the elapsed time exceeds the threshold, then the first device (e.g., the mobile device or a server) can establish the one or more additional geographical areas.

In one embodiment, only additional geographical areas that encompass the route or are sufficiently close to the route are added. For example, the route can be compared to the second set of locations to identify locations within a threshold distance of the route. The threshold distance can be such that the geographical areas encompass the route or slightly longer in case the user deviates from the route, which might lead to a trigger of such additional geographical areas depending on the extent of deviation from the route.

Additionally, embodiments can determine whether any one of the additional geographical areas for the identified locations will be triggered along the route before any one of the first geographical areas. This will be true if the one of the additional geographical areas is predicted to be triggered before the elapsed time reaches the threshold, but can still be true even if the one of the additional geographical areas is not predicted to be triggered before the elapsed time reaches the threshold. In one embodiment, the additional geographical areas for the identified locations that will be triggered along the route before any one of the first geographical areas can be established, and those not meeting this criteria are not established.

The prediction may be made using other information besides route information. For example, the distance between a current location of the mobile device and any of the first locations may be used. If the distance is very great (e.g., greater than a predetermined amount), then the prediction can be made that the threshold will be exceeded. Accordingly, embodiments can predict whether the elapsed time will reach the threshold before any one of the first geographical areas are triggered. If the prediction indicates that the elapsed time will reach the threshold before any one of the first geographical areas are triggered, embodiments can establish the one or more additional geographic areas before the elapsed reaches the threshold.

IV. Determining Additional Geo-Fences

As provided in block 350 of method 300, one or more additional geographical areas can be identified based on a second identifier that identifies a second set of locations not in the first set of locations. This second identifier can be selected based on the first identifier. In one embodiment, the locations of the additional geo-fences can be determined based on keywords similar to those associated with the first locations. For example, if the search (i.e., the first identifier) was for a particular drugstore, then the expansion (i.e., the second identifier) can be for other drug stores. If the request added other information, such as a particular drug store with a pharmacy, then additional locations with pharmacies can be identified.

Figure 5:
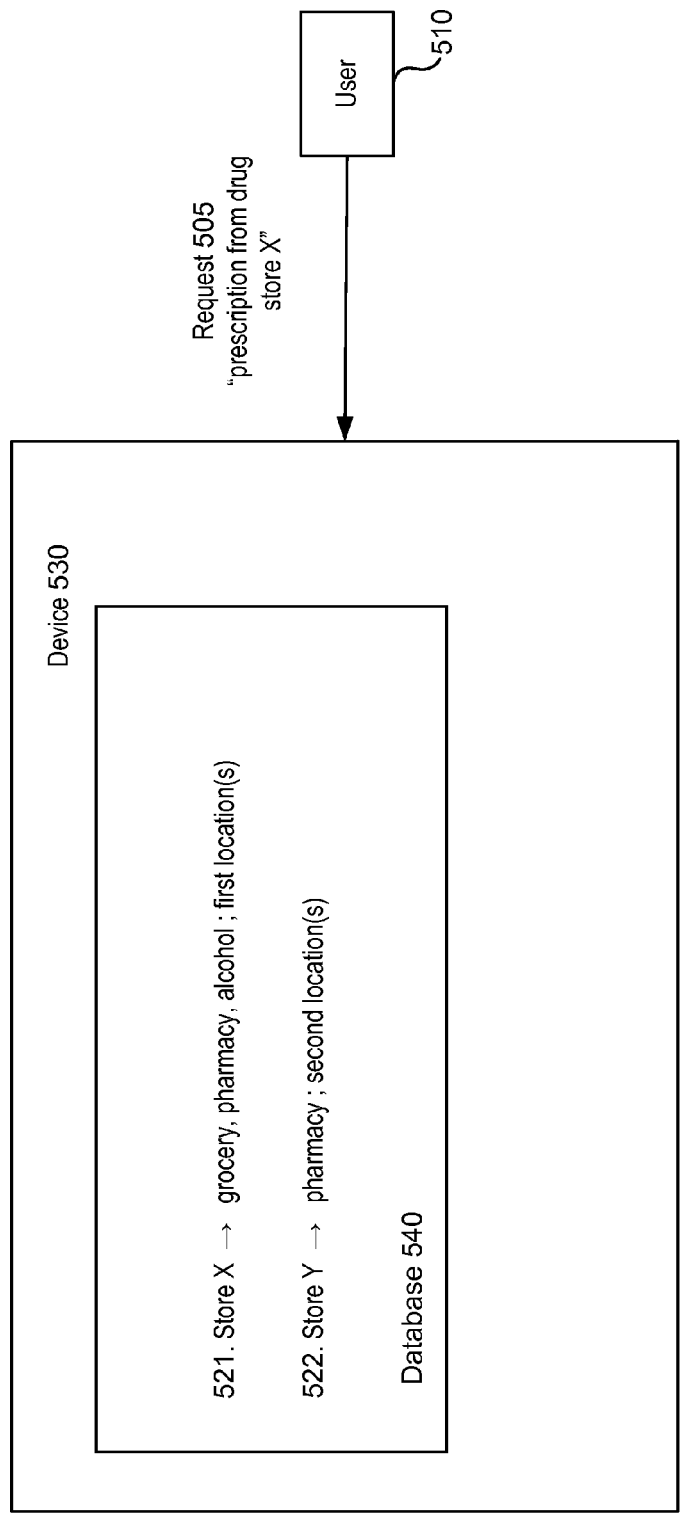
FIG. 5 is a diagram 500 showing a device in communication with a database used to select a second identifier for determining one or more additional geographical areas to associate with a location-based function according to embodiments of the present invention.

FIG. 5 is a diagram 500 showing a device in communication with a database used to select a second identifier for determining one or more additional geographical areas to associate with a location-based function according to embodiments of the present invention. User 510 provides a request 505 to create a location-based function to device 530. Request 505 includes a first identifier of "prescription from store X", which is combination of two identifiers: "prescription" and the name of the drug store.

Device 530 can receive the first identifier and access a database 540, which stores locations (e.g., as records) associated with keywords (e.g., categories of items). Database 540 may be part of device 530 or be external, but in communication with device 530. Database 540 can store records with associated keywords, which may correspond to services or goods (e.g., categories of items that can be purchased) available at the locations. Database 540 can store records in various formats for accessing information according to different schema.

As one example, database 540 can store record 521 with the name "Store X" associated with the keywords grocery, pharmacy, and alcohol, which correspond to categories of items that can be purchased at Store X. Database 540 and/or device 530 can determine such categories through a variety of means, as will be known to one skilled in the art. Record 521 can also have one or more first locations associated with it. These first locations can be used for determining the geographical areas to be used when record 521 matches request 505.

In this example, record 521 does match request 505 as record 521 is associated with "store X". Thus, the term "prescription" may not be needed. However, if only some locations of Store X has pharmacies, device 530 can identify only those locations. In such an instance, records 521 may point to child records, where each location has a list of keywords. Device 530 can use the name "X" to identify the locations for which geographical areas are to be established for request 505.

Once the elapsed time reaches the threshold (or other criteria for adding locations is satisfied), other records can be searched for finding additional geographic areas. In one embodiment, the second identifier used in this additional search can be based on keywords common to the records initially identified (e.g., record 521). These common keywords can be used to provide an expanded or alternate search criteria. The list of other locations matching the expanded search criteria can be stored or used before, at, or after the time of the elapsed time exceeding the threshold.

In this example, the second identifier can be determined based on one or more similar keywords that are associated with store X and store Y in database 540. Record 521 (Store X) can be associated with the keyword "pharmacy" and record 522 (Store Y) can also be associated with the keyword "pharmacy". Given request 505 uses "prescription," device 530 can translate the term "prescription" to the keyword "pharmacy," which is a category of the type of items that can be found at the first locations. Then, the keyword "pharmacy" can be used as the second identifier to search other records to find other matches. Such a search can identify record 522 and its associated locations.

As another example, the first identifier could just be "store X". In such an example, once the determination is made to add geo-fences, device 530 could then look for locations that have keywords similar to record 521. If the keyword corresponding to the exact item is not known (e.g., it is not known whether the user wants the grocery, pharmacy, or alcohol), then some of the suggested locations may not suit the person's need. However, device 530 could prompt the user for a required item that can be translated to a keyword (e.g., "milk" can be identified as a grocery item) or the keyword itself. The list of suggested locations can be provided to the user, where the user can select the appropriate locations to add, thereby allowing the user determine which location will suit the person's need.

V. Prompting User

In one embodiment, the user can be prompted to inquire whether the additional geographical areas are to be established. For example, a audio or a visual prompt of "do you want to expand the geo areas to include X stores" can be added. The prompt can be more general, such as "do you want to expand the geo-fences to include all stores with a pharmacy" (or whatever service was specified in the request). The prompt can provide a list of other acceptable location matching the expanded search criteria. In some cases the user may not want to expand the search, e.g., if the prescription is at a particular store or branch of a store.

In one embodiment, the prompt can be provided at the time of providing the initial request for creating the geo-fences. For example, the prompt can ask "do you want only X drug store, or do you want any pharmacy." As another example, the prompt could provide a list of alternative identifiers to add to the search for establishing the geographical areas. Thus, an immediate response to the user's request can be provided to broaden the initial criteria for creating the geographical areas. In other embodiments, the response to broaden comes after the elapsed time, as described above.

Figure 6:
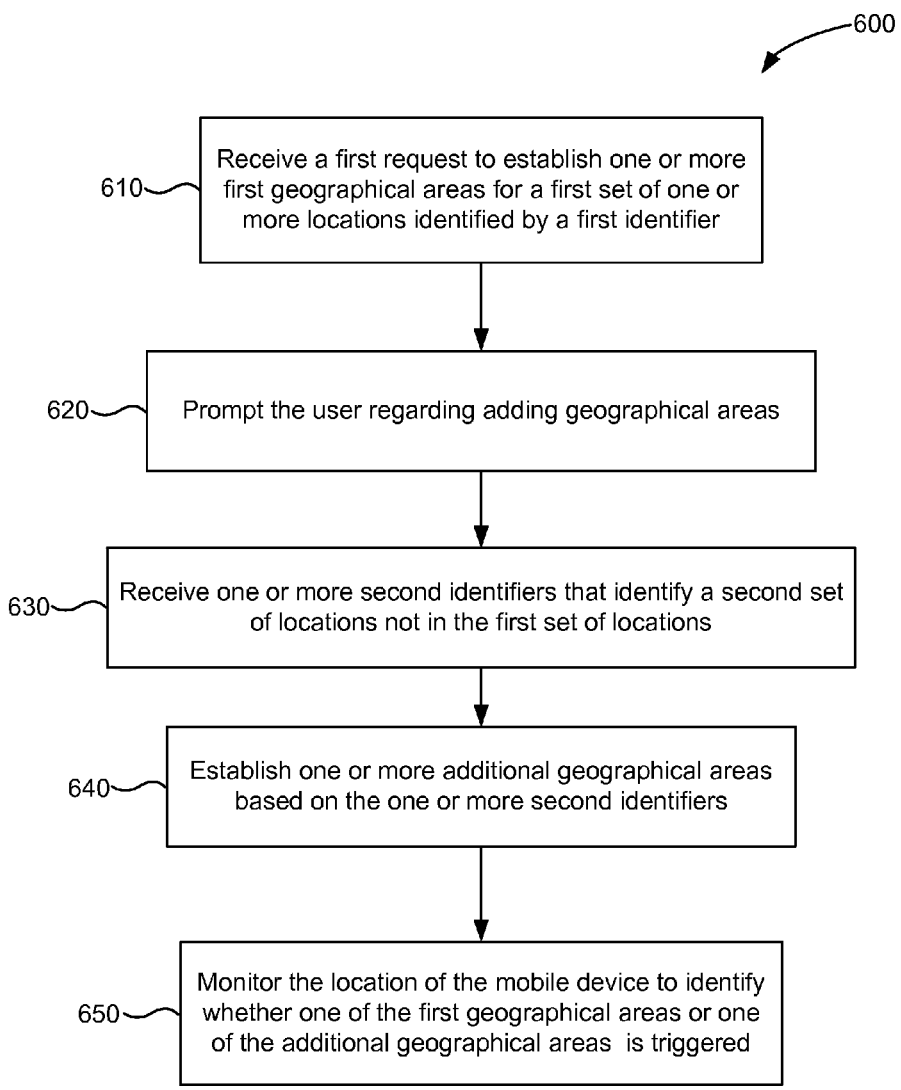
FIG. 6 is a flowchart illustrating a method 600 for prompting a user regarding adding geographical areas (e.g., geo-fences) associated with a location-based function according to embodiments of the present invention.

FIG. 6 is a flowchart illustrating a method 600 for prompting a user regarding adding geographical areas (e.g., geo-fences) associated with a location-based function according to embodiments of the present invention. As with method 300, the location-based function can be associated with one or more locations, each with a geographical area (e.g., a geo-fence) around it. Various embodiments can implement features from method 300 for method 600.

At block 610, a first device receives, from a user, a first request to establish one or more first geographical areas for a mobile device for triggering a location-based function. The first request includes a first identifier that identifies a first set of one or more locations for establishing the one or more first geographical areas. For example, the first identifier could be the name of a particular store, which might correspond to one or more branches of the store. As another example, the first identifier could correspond to a category that corresponds to different stores.

At block 620, the user is prompted regarding adding geographical areas. For example, a question could be provided via audio or visually as to whether the user wants to add more geographical areas. In various embodiments, the question can be whether the user wants to use a broader search term for identifying locations, whether the user wants to add more locations (where the question can include the first set of locations), and can include more specific information, such as a list of possible search terms to use. In one implementation, the prompt can simply inform the user that more geographical areas are being added, and possibly provide a list or criteria used to determine the geographical areas being added.

The prompt can be sent at various times. For example, the prompt can be sent soon after the request is received. Various criteria can be used to determine whether a prompt is to be sent, e.g., based on a number of locations in the first set. If the criteria are satisfied (or not satisfied depending on how the criteria is defined), the prompt may be sent. The criteria can include an elapsed time reaching a threshold, as in method 300.

At block 630, one or more second identifiers are received, where the second identifiers identify a second set of locations not in the first set of locations. The second identifiers can be received from the user, e.g., when the prompt includes a request for such additional identifiers. In addition or instead of receiving identifiers from the user, the second identifiers can be determined by accessing a database (e.g., database 540) to determine other keywords applicable to the request. For example, keywords that are associated with the first set of locations (but which were not in the user's request) can be used as the one or more second identifiers.

At block 640, one or more additional geographical areas are established based on the one or more second identifiers. The second identifier(s) can identify both the second set of locations and the first set of locations, just the second set of locations, or the second set of locations and just a portion of the first set of locations. The one or more additional geographical areas can be established soon after the one or more second identifier are received and the second set of locations are identified. In another embodiment, the one or more additional geographical areas can be established at a predetermined time, e.g., as set by a user or determined by the device.

At block 650, the location of the mobile device is monitored to identify whether one of the first geographical areas or one of the additional geographical areas is triggered by the mobile device crossing a boundary of one of the first geographical areas or one of the additional geographical areas. When the geo-fence is triggered, an alert can be provided. Other functionality can be performed in addition or instead of an alert when the geo-fence is triggered. For example, a song or a video could be played in response to the trigger, an event could be added to a calendar, etc.

VI. Mobile Device and Server

FIG. 7A is a simplified block diagram of an implementation of a mobile device 700 according to an embodiment of the present invention. Device 700 can be a handheld device, a notebook computer or any suitable electronic device with a screen for displaying images and that is capable of communicating with a server 750 as described herein. Device 700 includes a processing subsystem 702, a storage subsystem 704, a user input device 706, a user output device 708, a network interface 710, and a location/motion detector 712.

Processing subsystem 702, which can be implemented as one or more integrated circuits (e.g., e.g., one or more single-core or multi-core microprocessors or microcontrollers), can control the operation of device 700. In various embodiments, processing subsystem 702 can execute a variety of programs in response to program code and can maintain multiple concurrently executing programs or processes. At any given time, some or all of the program code to be executed can be resident in processing subsystem 702 and/or in storage subsystem 704.

Through suitable programming, processing subsystem 702 can provide various functionality for device 700. For example, processing subsystem 702 can execute an alert application program (or "app") 716, or other location-based function app. Alert app 716 can perform all or parts of methods described herein, such as determining the perimeter of geo-fences (e.g., which can be stored in 719 or 768 of server 750), which ones are active, and when a geo-fence is crossed. Alert app 716 can use location information from location/motion detector 712, e.g., as described herein.

Storage subsystem 704 can be implemented, e.g., using disk, flash memory, or any other storage media in any combination, and can include volatile and/or non-volatile storage as desired. In some embodiments, storage subsystem 704 can store one or more application programs to be executed by processing subsystem 702 (e.g., alert app 716). In some embodiments, storage subsystem 704 can store other data (e.g., used by and/or defined by alert app 716). For example, database 717 can store records with associated keywords and locations. Programs and/or data can be stored in non-volatile storage and copied in whole or in part to volatile working memory during program execution.

A user interface can be provided by one or more user input devices 706 and one or more user output devices 708. User input devices 706 can include a touch pad, touch screen, scroll wheel, click wheel, dial, button, switch, keypad, microphone, or the like. User output devices 708 can include a video screen, indicator lights, speakers, headphone jacks, or the like, together with supporting electronics (e.g., digital-to-analog or analog-to-digital converters, signal processors, or the like). A customer can operate input devices 706 to invoke the functionality of device 700 and can view and/or hear output from device 700 via output devices 708.

Network interface 710 can provide voice and/or data communication capability for device 700. For example, network interface 710 can provide device 700 with the capability of communicating with server 750. In some embodiments network interface 710 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), and/or other components. In some embodiments network interface 710 can provide wired network connectivity (e.g., Ethernet) in addition to or instead of a wireless interface. Network interface 710 can be implemented using a combination of hardware (e.g., antennas, modulators/demodulators, encoders/decoders, and other analog and/or digital signal processing circuits) and software components.

Location/motion detector 712 can detect a past, current or future location of device 700 and/or a past, current or future motion of device 700. For example, location/motion detector 712 can detect a velocity or acceleration of mobile electronic device 700. Location/motion detector 712 can comprise a Global Positioning Satellite (GPS) receiver and/or an accelerometer. In some instances, processing subsystem 702 determines a motion characteristic of device 700 (e.g., velocity) based on data collected by location/motion detector 712. For example, a velocity can be estimated by determining a distance between two detected locations and dividing the distance by a time difference between the detections.

FIG. 7B is a simplified block diagram of an implementation of a server 750 according to an embodiment of the present invention. Server 750 may simply receive and forward a conditional communication, determine which device to forward a conditional communication, and/or analyze the conditional communication to determine how and when it is satisfied. Server 750 includes a processing subsystem 752, storage subsystem 754, a user input device 756, a user output device 758, and a network interface 760. Network interface 760 can have similar or identical features as network interface 710 of device 700 described above.

Processing subsystem 752, which can be implemented as one or more integrated circuits (e.g., a conventional microprocessor or microcontroller), can control the operation of server 750. In various embodiments, processing subsystem 752 can execute a variety of programs in response to program code and can maintain multiple concurrently executing programs or processes. At any given time, some or all of the program code to be executed can be resident in processing subsystem 752 and/or in storage subsystem 754.

Through suitable programming, processing subsystem 752 can provide various functionality for server 750. Thus, server 750 can interact with alert app 716 (e.g., via alert routine 766) being executed on device 700 in order to provide information from database 767, indications of an elapsed time reaching a threshold, a message indicating a geo-fence has been crossed, an alert, and other information mentioned herein. Server 750 can also perform same or similar functionality as device 700.

Storage subsystem 754 can be implemented, e.g., using disk, flash memory, or any other storage media in any combination, and can include volatile and/or non-volatile storage as desired. In some embodiments, storage subsystem 754 can store one or more application programs (e.g., alert routine 766) to be executed by processing subsystem 752. In some embodiments, storage subsystem 754 can store other data, such as geo-fences 768 and location records in database 767. Programs and/or data can be stored in non-volatile storage and copied in whole or in part to volatile working memory during program execution.

A user interface can be provided by one or more user input devices 756 and one or more user output devices 758. User input and output devices 756 and 758 can be similar or identical to user input and output devices 706 and 708 of device 700 described above. In some instances, user input and output devices 756 and 758 are configured to allow a programmer to interact with server 750. In some instances, server 750 can be implemented at a server farm, and the user interface need not be local to the servers.

It will be appreciated that device 700 and server 750 described herein are illustrative and that variations and modifications are possible. A device can be implemented as a mobile electronic device and can have other capabilities not specifically described herein (e.g., telephonic capabilities, power management, accessory connectivity, etc.). In a system with multiple devices 700 and/or multiple servers 750, different devices 700 and/or servers 750 can have different sets of capabilities; the various devices 700 and/or servers 750 can be but need not be similar or identical to each other.

Further, while device 700 and server 750 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 700 and server 750 are described as singular entities, it is to be understood that each can include multiple coupled entities. For example, server 750 can include, a server, a set of coupled servers, a computer and/or a set of coupled computers.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method comprising:
   receiving, at a first device from a user, a first request to establish one or more first geographical areas for a mobile device for triggering a location-based function, the first request including a first identifier that identifies a first set of one or more locations for establishing the one or more first geographical areas;
   identifying a start time for establishing the one or more first geographical areas;
   monitoring a location of the mobile device to identify whether one of the first geographical areas is triggered by the mobile device crossing a boundary of one of the first geographical areas;
   monitoring an elapsed time relative to the start time where none of the first geographical areas are triggered;
   when the elapsed time exceeds a threshold, establishing one or more additional geographical areas based on a second identifier that identifies a second set of one or more locations not in the first set of one or more locations; and
   monitoring the location of the mobile device relative to both the one or more first geographical areas and the one or more additional geographical areas to identify whether one of the first geographical areas or one of the additional geographical areas is triggered by the mobile device crossing a boundary of one of the first geographical areas or one of the additional geographical areas.

2. The method of claim 1, further comprising:
   predicting whether the elapsed time will reach the threshold before any one of the first geographical areas are triggered; and
   if the prediction indicates that the elapsed time will reach the threshold before any one of the first geographical areas are triggered, establishing the one or more additional geographic areas before the elapsed reaches the threshold.

3. The method of claim 1, wherein monitoring the elapsed time includes:
   receiving a route to be traveled by the mobile device;
   comparing the route to the one or more first geographical areas to determine whether the mobile device will trigger a first geographical area before the elapsed time exceeds the threshold,
   wherein the one or more additional geographical areas are established in response to a determination that the mobile device will not trigger a first geographical area before the elapsed time exceeds the threshold.

4. The method of claim 3, further comprising:
   comparing the route to the second set of locations to identify locations within a threshold distance of the route, wherein the additional geographical areas are established for the identified locations.

5. The method of claim 4, further comprising:
   determining whether any one of the additional geographical areas for the identified locations will be triggered along the route before any one of the first geographical areas; and
   establishing the additional geographical areas for the identified locations that will be triggered along the route before any one of the first geographical areas.

6. The method of claim 1, further comprising:
   notifying the user that the elapsed time exceeds the threshold; and
   prompting the user as to whether the additional geographical areas are to be established.

7. The method of claim 6, wherein the one or more additional geographical areas are established in response to an affirmative indication from the user.

8. The method of claim 1, further comprising:
   selecting the second identifier based on the first identifier.

9. The method of claim 1, wherein the location-based function is an alert provided to the user when a geographical area is triggered.

10. The method of claim 1, wherein the second identifier identifies both the second set of locations and the first set of locations.

11. The method of claim 1, wherein the first device is the mobile device.

12. The method of claim 1, further comprising:
    identifying an expanded group of one or more additional geographic areas related to the first identifier;
    prompting the user regarding adding the one or more additional geographical areas;
    receiving an acknowledgment from the user to add one or more of the additional geographical areas;
    establishing the one or more additional geographical areas; and
    monitoring the location of the mobile device relative to both the one or more first geographical areas and the one or more additional geographical areas to identify whether one of the first geographical areas or one of the additional geographical areas is triggered by the mobile device crossing a boundary of one of the first geographical areas or one of the additional geographical areas.

13. The method of claim 12, wherein the prompt regarding adding geographical areas informs the user that the first set of one or more locations has been expanded.

14. The method of claim 12, wherein the one or more additional geographical are established only if a response from the user indicates that other geographical areas are to be added.

15. The method of claim 12, wherein the prompt includes a list of one or more additional identifiers.

16. The method of claim 15, further comprising:
    receiving, from the user, a selection of the one or more of the additional geographic areas.

17. A computer product comprising a non-transitory computer readable medium storing a plurality of instructions that when executed control a computer system, the instructions comprising:
    receiving, from a user, a first request to establish one or more first geographical areas for a mobile device for triggering a location-based function, the first request including a first identifier that identifies a first set of one or more locations for establishing the one or more first geographical areas;

identifying a start time for establishing the one or more first geographical areas;

monitoring a location of the mobile device to identify whether one of the first geographical areas is triggered by the mobile device crossing a boundary of one of the first geographical areas;

monitoring an elapsed time relative to the start time where none of the first geographical areas are triggered;

when the elapsed time exceeds a threshold, establishing one or more additional geographical areas based on a second identifier that identifies a second set of one or more locations not in the first set of one or more locations; and monitoring the location of the mobile device relative to both the one or more first geographical areas and the one or more additional geographical areas to identify whether one of the first geographical areas or one of the additional geographical areas is triggered by the mobile device crossing a boundary of one of the first geographical areas or one of the additional geographical areas.

18. The computer product of claim 17, further comprising:
predicting whether the elapsed time will reach the threshold before any one of the first geographical areas are triggered; and
if the prediction indicates that the elapsed time will reach the threshold before any one of the first geographical areas are triggered, establishing the one or more additional geographic areas before the elapsed reaches the threshold.

19. The computer product of claim 17, further comprising:
notifying the user that the elapsed time exceeds the threshold; and
prompting the user as to whether the additional geographical areas are to be established.

20. The computer product of claim 17, wherein monitoring the elapsed time includes:
receiving a route to be traveled by the mobile device;
comparing the route to the one or more first geographical areas to determine whether the mobile device will trigger a first geographical area before the elapsed time exceeds the threshold,
wherein the one or more additional geographical areas are established in response to a determination that the mobile device will not trigger a first geographical area before the elapsed time exceeds the threshold.

21. The method of claim 1, wherein the establishing further comprises determining the one or more additional geographic areas based on the first request received from the user.

22. The method of claim 1, wherein the establishing further comprises determining the one or more additional geographic areas based on similar locations to the one or more first locations.

23. The method of claim 1, wherein the establishing further comprises determining the one or more additional geographic areas based on paths recently travel by user.

24. The method of claim 1, wherein the start time is identified from the first request.

25. The method of claim 1, wherein the threshold is specified by the user.

26. The method of claim 1, wherein the one or more additional geographical areas are established automatically without human intervention.

27. The computer product of claim 20, wherein the instructions further comprising:
comparing the route to the second set of locations to identify locations within a threshold distance of the route, wherein the additional geographical areas are established for the identified locations.

28. The computer product of claim 27, wherein the instructions further comprising:
determining whether any one of the additional geographical areas for the identified locations will be triggered along the route before any one of the first geographical areas; and
establishing the additional geographical areas for the identified locations that will be triggered along the route before any one of the first geographical areas.

29. The computer product of claim 19, wherein the one or more additional geographical areas are established in response to an affirmative indication from the user.

30. The computer product of claim 17, wherein the instructions further comprising:
selecting the second identifier based on the first identifier.

31. The computer product of claim 17, wherein the location-based function is an alert provided to the user when a geographical area is triggered.

32. The computer product of claim 17, wherein the second identifier identifies both the second set of locations and the first set of locations.

33. The computer product of claim 17, wherein the first device is the mobile device.

34. The computer product of claim 17, wherein the establishing further comprises determining the one or more additional geographic areas based on the first request received from the user.

35. The computer product of claim 17, wherein the establishing further comprises determining the one or more additional geographic areas based on similar locations to the one or more first locations.

36. The computer product of claim 17, wherein the establishing further comprises determining the one or more additional geographic areas based on paths recently travel by user.

37. The computer product of claim 17, wherein the start time is identified from the first request.

38. The computer product of claim 17, wherein the threshold is specified by the user.

39. The computer product of claim 17, wherein the one or more additional geographical areas are established automatically without human intervention.

40. A device comprising:
a user input device configured to receive, from a user, a first request to establish one or more first geographical areas for a mobile device for triggering a location-based function, the first request including a first identifier that identifies a first set of one or more locations for establishing the one or more first geographical areas;
a location detection circuit configured to facilitate monitoring a location of the mobile device to identify whether one of the first geographical areas is triggered by the mobile device crossing a boundary of one of the first geographical areas;
a timer for facilitating : (i) identifying a start time for establishing the one or more first geographical areas, and (ii) monitoring an elapsed time relative to the start time where none of the first geographical areas are triggered; and
a processing subsystem configured to establish one or more additional geographical areas based on a second identifier that identifies a second set of one or more locations not in the first set of one or more locations, when the elapsed time exceeds a threshold, wherein
the location detection circuit is further configured to facilitate monitoring the location of the mobile device relative to both the one or more first geographical areas and the one or more additional geographical areas to identify whether one of the first geographical areas or one of the additional geographical areas is triggered by the mobile device crossing a boundary of one of the first geographical areas or one of the additional geographical areas.

41. The device of claim 40, wherein the processing subsystem is further configured to:
   predict whether the elapsed time will reach the threshold before any one of the first geographical areas are triggered; and
   if the prediction indicates that the elapsed time will reach the threshold before any one of the first geographical areas are triggered, establish the one or more additional geographic areas before the elapsed reaches the threshold.

42. The device of claim 40, wherein monitoring the elapsed time includes:
   receiving a route to be traveled by the mobile device;
   comparing the route to the one or more first geographical areas to determine whether the mobile device will trigger a first geographical area before the elapsed time exceeds the threshold,
   wherein the one or more additional geographical areas are established in response to a determination that the mobile device will not trigger a first geographical area before the elapsed time exceeds the threshold.

43. The device of claim 40, wherein the processing subsystem is further configured to:
   compare the route to the second set of locations to identify locations within a threshold distance of the route, wherein the additional geographical areas are established for the identified locations.

44. The device of claim 40, wherein the processing subsystem is further configured to:
   determine whether any one of the additional geographical areas for the identified locations will be triggered along the route before any one of the first geographical areas; and
   establish the additional geographical areas for the identified locations that will be triggered along the route before any one of the first geographical areas.

45. The device of claim 40, wherein the processing subsystem is further configured to:
   notify the user that the elapsed time exceeds the threshold; and
   prompt the user as to whether the additional geographical areas are to be established.

46. The device of claim 40, wherein the establishing further comprises determining the one or more additional geographic areas based on the first request received from the user.

47. The device of claim 40, wherein the establishing further comprises determining the one or more additional geographic areas based on similar locations to the one or more first locations.

48. The device of claim 40, wherein the establishing further comprises determining the one or more additional geographic areas based on paths recently travel by user.

49. The device of claim 40, wherein the start time is identified from the first request.

50. The device of claim 40, wherein the threshold is specified by the user.

51. The device of claim 40, wherein the one or more additional geographical areas are established automatically without human intervention.

* * * * *

UNITED STATES PATENT AND TRADEMARK OFFICE
CERTIFICATE OF CORRECTION

PATENT NO. : 9,215,559 B2  
APPLICATION NO. : 13/784645  
DATED : December 15, 2015  
INVENTOR(S) : Dave et al.

Page 1 of 1

It is certified that error appears in the above-identified patent and that said Letters Patent is hereby corrected as shown below:

In the claims,

Claim 23, col. 15, line 56, please delete "recently travel by user" and insert --recently traveled by the user--;

Claim 36, col. 16, line 36, please delete "recently travel by user" and insert --recently traveled by the user--;

Claim 41, col. 17, line 15, please delete "elapsed reaches" and insert --elapsed time reaches--;

Claim 48, col. 18, line 25, please delete "recently travel by user" and insert --recently traveled by the user--.

Signed and Sealed this  
Eighth Day of March, 2016

Michelle K. Lee  
*Director of the United States Patent and Trademark Office*